(No Model.)

W. B. LEARNED.
METHOD OF ATTACHING HUBS TO GEAR WHEELS AND PINIONS.

No. 344,321. Patented June 22, 1886.

Witnesses:
H. Brown,
A. Harrison

Inventor:
Wm B. Learned
by Wright & Brown
Attys.

UNITED STATES PATENT OFFICE.

WILLIAM B. LEARNED, OF BOSTON, MASSACHUSETTS.

METHOD OF ATTACHING HUBS TO GEAR-WHEELS AND PINIONS.

SPECIFICATION forming part of Letters Patent No. 344,321, dated June 22, 1886.

Application filed October 31, 1885. Serial No. 181,464. (No model.)

*To all whom it may concern:*

Be it known that I, WILLIAM B. LEARNED, of Boston, in the county of Suffolk and State of Massachusetts, have invented certain new and useful Improvements in Gear-Wheels and Pinions, of which the following is a specification.

This invention relates to such small gear-wheels and pinions for watch and clock movements and other analogous mechanism as are composed of a main portion comprising the center, toothed rim, and the arms connecting the center and rim, formed in one piece, and a hub formed in another piece and rigidly attached to the wheel-center for the reception of the staff or arbor of the wheel.

It is the usual practice to attach the hub to the body of the wheel by placing it in a circular orifice in the wheel-center, and expand it therein by upsetting one of its ends until it bears closely against all parts of said circular recess. The outward pressure of the hub against the wheel-center, caused by the expansion of the hub when said pressure is directed against the margin of a circular orifice in the wheel-center, causes said center to expand, and thus displace or move outwardly the arms of the wheel in the direction of their length and cause them to stretch, and therefore slightly flatten the portions of the wheel-rim between the arms, thus impairing the concentricity of the toothed rim.

My invention has for its object to obviate this objection; and to this end it consists in forming one or more notches or indentations in the circular orifice in the wheel-center and expanding the hub into said indentations, as I will now proceed to describe.

Figure 1:
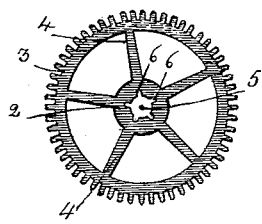
Figure 2:
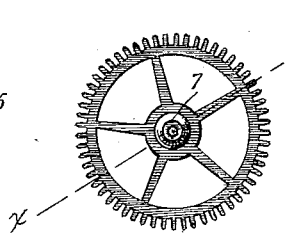
Figures 3, 4:
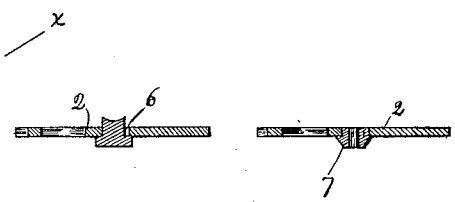

In the accompanying drawings, forming a part of this specification, Figure 1 represents a side view of the body of the wheel before the hub is applied. Fig. 2 represents a similar view with the hub in place. Fig. 3 represents a sectional view of the wheel, showing the condition of the hub before it is expanded or upset; and Fig. 4 represents a sectional view of the completed wheel on line $x\ x$, Fig. 2.

The same letters of reference indicate the same parts in all the figures.

In carrying out my invention I form the body of the wheel in one piece, as usual, said piece being composed of the center 2, the toothed rim 3, and the arms 4, connecting said center and rim.

In the center 2 I form an orifice, 5, which has the general form of a circle, but has the circular continuity of its margin interrupted by one or more indentations or notches, 6, formed in the wheel-center. Said indentations are preferably formed to coincide with the arms 4, as shown in Figs. 1 and 2, there being an indentation for each arm; but, if desired, a smaller number of indentations may be made without departing from the spirit of my invention. The indentations may be rounded, as shown, or V-shaped, or of any other desired form.

The hub 7 is made in the usual form, one end being larger than the orifice 5, so that it projects from one side of the wheel. The other end is formed to be inserted in the orifice 5, and is preferably cupped or hollowed, as shown in Fig. 3, to facilitate the expanding or upsetting operation. The hub placed in the orifice 5, as shown in Fig. 3, is upset or expanded by blows or pressure on its smaller end, and is thus caused to fill the orifice 5 and the indentations 6, as shown in Figs. 2 and 4. Said indentations receive portions of the expanded hub, and thus lock the hub to the wheel-center without the necessity for such extreme pressure on the margin of the orifice 5 by the expanded hub as would expand the wheel-center; hence the expansion of the hub does not displace the arms 4 nor distort the rim 3. The filling of the indentations by the expanded hub securely engages the hub with the wheel-center and prevents either from turning independently.

It will be seen that my improvement enables small and delicate wheels and pinions to be provided with hubs without the disadvantages heretofore attending the operation, thus improving the quality and decreasing the cost of manufacture, no subsequent operations being required to remedy defects in the shape of the wheel-rim, caused by the attachment of the hub to the wheel-center.

I claim—

The method herein described of attaching hubs to small gear-wheels and pinions, the same consisting in forming in the wheel-center an orifice with one or more indentations in the margin thereof, and upsetting or expanding the hub in said orifice until it enters said indentations, as set forth.

In testimony whereof I have signed my name to this specification, in the presence of two subscribing witnesses, this 27th day of October, 1885.

WILLIAM B. LEARNED.

Witnesses:
C. F. BROWN,
H. BROWN.